(12) United States Patent
Chang et al.

(10) Patent No.: US 8,855,566 B2
(45) Date of Patent: Oct. 7, 2014

(54) APPARATUS FOR MANAGING RADIO RESOURCES OF BASE STATION AND METHOD FOR MANAGING THE SAME

(75) Inventors: Sung Cheol Chang, Daejeon (KR); Hyun-Jae Kim, Incheon (KR); Won-Ik Kim, Daejeon (KR); Sung Kyung Kim, Daejoen (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/907,439

(22) Filed: Oct. 19, 2010

(65) Prior Publication Data

US 2011/0092239 A1    Apr. 21, 2011

(30) Foreign Application Priority Data

Oct. 19, 2009 (KR) .......... 10-2009-0099389
Oct. 11, 2010 (KR) .......... 10-2010-0098972

(51) Int. Cl.
*H04B 15/00* (2006.01)
*H04W 72/08* (2009.01)
*H04W 88/08* (2009.01)

(52) U.S. Cl.
CPC ............ *H04W 72/085* (2013.01); *H04W 88/08* (2013.01)
USPC ........... 455/62; 455/456.1; 455/509; 370/328

(58) Field of Classification Search
CPC .................................................. H04W 72/085
USPC .......................... 455/62, 509, 456.1; 370/328
See application file for complete search history.

(56) References Cited

U.S. PATENT DOCUMENTS

| | | | |
|---|---|---|---|
| 2002/0093920 A1* | 7/2002 | Neufeld et al. | 370/311 |
| 2002/0145988 A1* | 10/2002 | Dahlman et al. | 370/335 |
| 2003/0100269 A1* | 5/2003 | Lehtinen et al. | 455/69 |
| 2003/0171132 A1* | 9/2003 | Ho et al. | 455/522 |
| 2004/0131029 A1* | 7/2004 | Tobe et al. | 370/331 |
| 2004/0203882 A1* | 10/2004 | Laiho et al. | 455/456.1 |
| 2006/0251012 A1* | 11/2006 | Hara et al. | 370/328 |

* cited by examiner

*Primary Examiner* — Hsin-Chun Liao
(74) *Attorney, Agent, or Firm* — Jefferson IP Law, LLP

(57) ABSTRACT

A method for managing radio resources of a base station is provided. The method includes evaluating a radio environment between a base station and at least one neighboring base station or a radio environment between the base station and terminals connected to the base station, if the evaluated radio environment does not meet predetermined criteria, selecting a new radio resource, deactivating the existing radio resource, and reactivating the new radio resource. Accordingly, the radio resources can be efficiently managed.

13 Claims, 8 Drawing Sheets

APPARATUS FOR MANAGING RADIO RESOURCES OF BASE STATION AND METHOD FOR MANAGING THE SAME

PRIORITY

This application claims the benefit under 35 U.S.C. §119 (a) of Korean Patent Application Nos. 10-2009-0099389 and 10-2010-0098972 filed in the Korean Intellectual Property Office on Oct. 19, 2009 and Oct. 11, 2010, the entire disclosures of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) the Electronics and Telecommunications Research Institute (ETRI).

BACKGROUND OF THE INVENTION

1. Field of the Invention

The present invention relates to an apparatus for managing a base station in a mobile communication system. More particularly, the present invention relates to an apparatus and method for managing the radio resources of a base station in a mobile communication system.

2. Description of the Related Art

In a typical mobile communication system, base stations are fixed and arranged in a planned manner based on a radio environment. These base stations are connected to a backbone network to exchange information with neighboring base stations.

However, a radio environment including a moving base station has difficulty in arranging base stations in a planned manner. In such mobile communication systems, the radio environment is variable, and there may be no connection for exchanging information between base stations. Accordingly, there is a need for a technology for autonomously managing the operational conditions of radio resources, taking into consideration a situation where a base station moves or stops and an environment where a base station may or may not be connected to a backbone network.

The above information disclosed in this Background section is only for enhancement of understanding of the background of the invention and therefore may contain information that does not form the prior art that is already known in this country to a person of ordinary skill in the art.

SUMMARY OF THE INVENTION

An aspect of the present invention is to address the above-mentioned problems and/or disadvantages and to provide at least the advantages described below. Accordingly, an aspect of the present invention is to provide an apparatus for managing radio resources of a base station, which selects a new radio resource by recognizing a radio environment and activates the new radio resource.

In accordance with an aspect of the present invention, a method for managing radio resources of a base station is provided The method includes evaluating a radio environment between the base station and at least one neighboring base station or a radio environment between the base station and terminals connected to the base station, selecting a new radio resource when the evaluated radio environment does not meet predetermined criteria, and deactivating the existing radio resource and activating the new radio resource.

In accordance with another aspect of the present invention, an apparatus for managing radio resources of a base station is provided. The apparatus includes a radio environment evaluation unit for evaluating a radio environment between the base station and at least one neighboring base station or a radio environment between the base station and terminals connected to the base station, a radio resource selection unit for selecting a new radio resource when the evaluated radio environment does not meet predetermined criteria, and a radio resource activation unit for deactivating the existing radio resource and activating the new radio resource.

In accordance with another aspect of the present invention, a method of managing radio resources in a mobile base station is provided. The method includes operating in an operational state while a radio environment quality of an existing radio resource is within a reference value, operating in a reconfiguration determination state in which the mobile base station searches for and selects a new radio resource other than the existing radio resource, and operating in a reconfiguration progress state in which the mobile base station activates the new radio resource, deactivates the existing radio resource, and permits terminals to access the mobile base station via the new radio resource, wherein the mobile base station transitions from the operational state to the reconfiguration state when the radio environment quality is determined to be lower than the reference value, transitions from the reconfiguration determination state to the operational state when the mobile base station determines that the new radio resource does not need to be selected, transitions from the reconfiguration determination state to the reconfiguration progress state when the new radio resource is selected and verified, and transitions to the operational state from the reconfiguration progress state when the activation and deactivation processes are completed.

The base station can efficiently manage radio resources by selecting a new radio resource and activating it according to a changing radio environment. Particularly, service can be continuously provided to a terminal even in the process of activating a new radio resource. Moreover, a new radio resource can be activated for a terminal in an idle state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

In the following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize those various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, unless explicitly described to the contrary, the word "comprise" and variations such as "comprises" or "comprising" will be understood to imply the inclusion of stated elements but not the exclusion of other elements not mentioned.

As used herein, the terminal may refer to a Mobile Station (MS), a Mobile Terminal (MT), a Subscriber Station (SS), a Portable Subscriber Station (PSS), User Equipment (UE), an Access Terminal (AT), etc., and may include the entire or partial functions of the MT, the SS, the PSS, the UE, etc. A Base Station (BS) may refer to a Radio Access Station (RAS), a Node B, an evolved Node B (eNodeB), a Base Transceiver Station (BTS), a Mobile Multihop Relay (MMR)-BS, etc., and may include the entire or partial functions of the BS, the RAS, the Node B, the BTS, the MMR-BS, etc.

A method and apparatus for managing a base station according to an exemplary embodiment of the present invention is described below with reference to the accompanying drawings.

Figure 1:
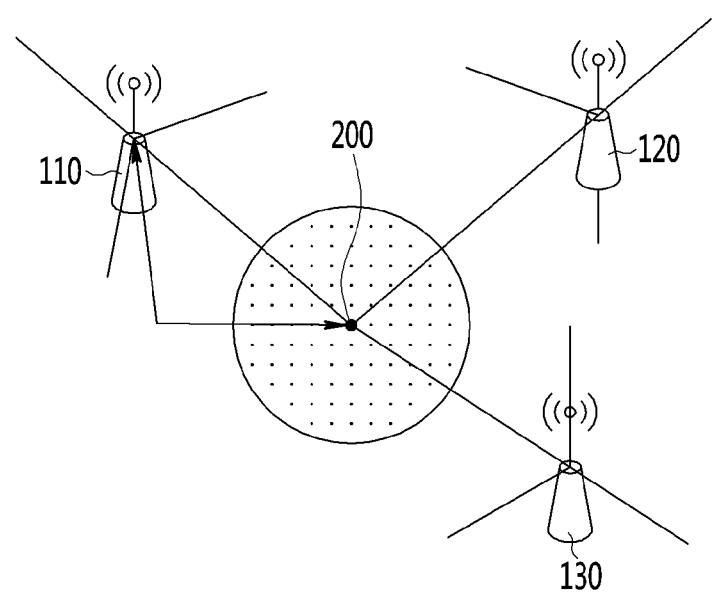
FIG. 1 is a view schematically showing a mobile communication system according to an exemplary embodiment of the present invention.

FIG. 1 is a view schematically showing a mobile communication system according to an exemplary embodiment of the present invention.

Referring to FIG. 1, the mobile communication system includes a plurality of base stations 110, 120, and 130. Each of the base stations 110, 120, and 130 provides mobile communication services by transmitting radio signals to and receiving radio signals from a terminal (not shown) located in a certain peripheral area, i.e., a cell. Each of the base stations 110, 120, and 130 may be mobile.

A base station according to an exemplary embodiment of the present invention is located at the location indicated by 200, and receives signals of the neighboring base stations 110, 120, and 130 to acquire information on its radio environment. The base station 200 may also be mobile.

The base station 200 is able to receive signals from the neighboring base stations 110, 120, and 130 by using an Over-The-Air-Receiver (OTAR) function, which is a technology for self-configuration of a base station. While the base station 200 operates in the OTAR mode, the base station 200 can receive signals from other base stations as if it were a terminal.

Figure 2:
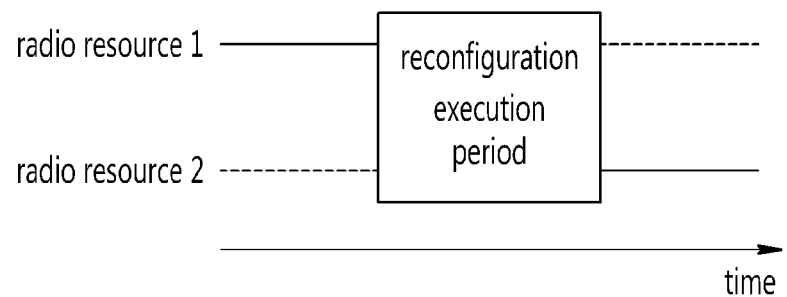
FIG. 2 is a view showing radio resource reconfiguration according to an exemplary embodiment of the present invention.

FIG. 2 is a view showing the concept of radio resource reconfiguration according to an exemplary embodiment of the present invention.

Referring to FIG. 2, when the base station 200 is performing a service using radio resource 1, the radio resource management apparatus of the base station 200 determines whether it is necessary to reconfigure the radio resources during a reconfiguration execution period. If it is necessary to reconfigure the radio resources for some reason, such as a change in radio environment, the radio resource management apparatus selects a new radio resource. If the radio resource management apparatus selects radio resource 2 as a new radio resource, the base station 200 continues to perform the service using radio resource 2 after the reconfiguration execution. A radio resource may include at least one of a frequency band and a Preamble Index (PI). If the base station 200 consists of sectors, the radio resource reconfiguration may be applied by sector.

Figure 3:
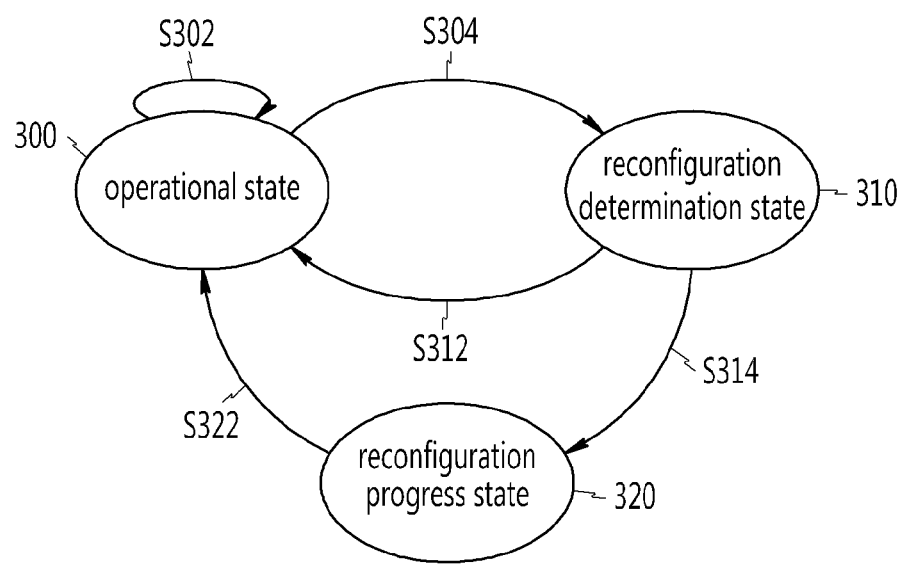
FIG. 3 is a state diagram of a radio resource management apparatus that manages radio resources according to an exemplary embodiment of the present invention.

FIG. 3 is a state diagram of a radio resource management apparatus that manages radio resources according to an exemplary embodiment of the present invention.

Referring to FIG. 3, the base station 200 performs a service using a currently activated radio resource. The radio resource management apparatus of the base station 200 continuously measures a radio environment by using the OTAR function in an operational state 300, and determines whether it is necessary to select a new radio resource based on the measured radio environment.

If it is determined not to select a new radio resource, that is, the service can be performed continuously using the currently activated radio resource, the radio resource management apparatus maintains the operational state in step S302. If it is determined to select a new radio resource, the radio resource management apparatus makes a transition to a reconfiguration determination state 310 in step S304.

In the reconfiguration determination state 310, the radio resource management apparatus searches and selects a new radio resource, and measures and verifies the new radio resource. If a new radio resource is not selected, the radio resource management apparatus transitions to the operational state 300 in step S312. If a new radio resource is selected and verified, the radio resource management apparatus transitions to a reconfiguration progress state 320 in step S314.

In the reconfiguration progress state 320, the radio resource management apparatus activates the new radio resource and deactivates the existing radio resource, and allows a terminal to receive the service using the new radio resource. Upon completion of radio resource reconfiguration in the reconfiguration progress state, the radio resource management apparatus makes a transition to the operational state 310 in step S322. In the operational state 300 and the reconfiguration determination state 310, the radio resource management apparatus collects and manages information for radio resource management.

Figure 4:
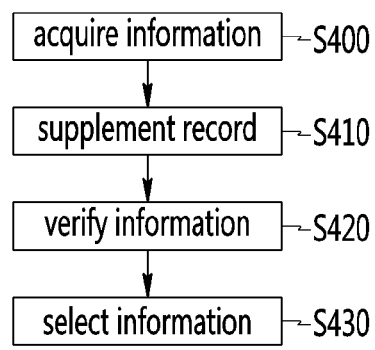
FIG. 4 is a flowchart showing a method in which a radio resource management apparatus manages information according to an exemplary embodiment of the present invention.

FIG. 4 is a flowchart showing a method in which a radio resource management apparatus manages information according to an exemplary embodiment of the present invention.

Referring to FIG. 4, the radio resource management apparatus acquires information on a radio environment in step S400. In one example, the information on a radio environment may be OTAR information acquired from the OTAR function. In another example, the information on a radio environment may be operational information of the neighboring base stations 110, 120, and 130 that the base station 200 obtains by connecting to a backbone network and exchanging messages with the neighboring base stations 110, 120, and 130.

The radio resource management apparatus supplements the record of the acquired information in step S410. The more recent value the acquired information has, the more significant it is, and the measured value can vary from location to location. Accordingly, a process for supplementing the record of the information by location and time may be implemented.

The radio resource management apparatus verifies the acquired information in step S420. If information on a radio environment is acquired when the base station 200 is not connected to a backbone network or the base station 200 is moving, verification of the acquired information may be beneficial. Even though the base station 200 is connected to a backbone network, if the acquired information is different from a pre-stored record, the radio resource management device can verify the acquired information under the assumption that the base station 200 is moving.

The radio resource management apparatus selects information on a radio environment in step S430. To this end, the radio resource management apparatus may give priority to a verified radio environment, and select information on a radio environment based on the priority. A method in which a radio resource management apparatus manages radio resources will be described with respect to FIGS. 5 and 6.

Figure 5:
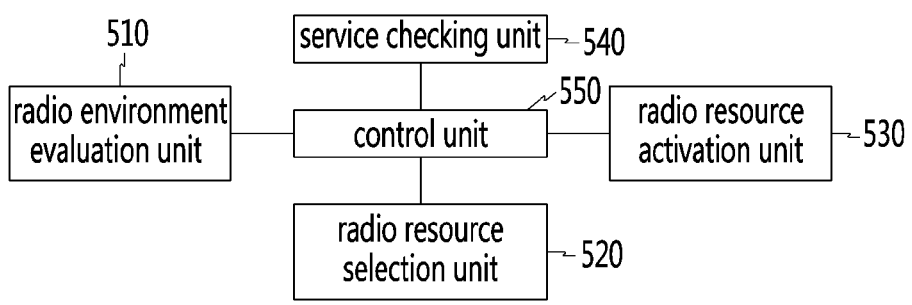
FIG. 5 is a block diagram showing a radio resource management apparatus according to an exemplary embodiment of the present invention.
Figure 6:
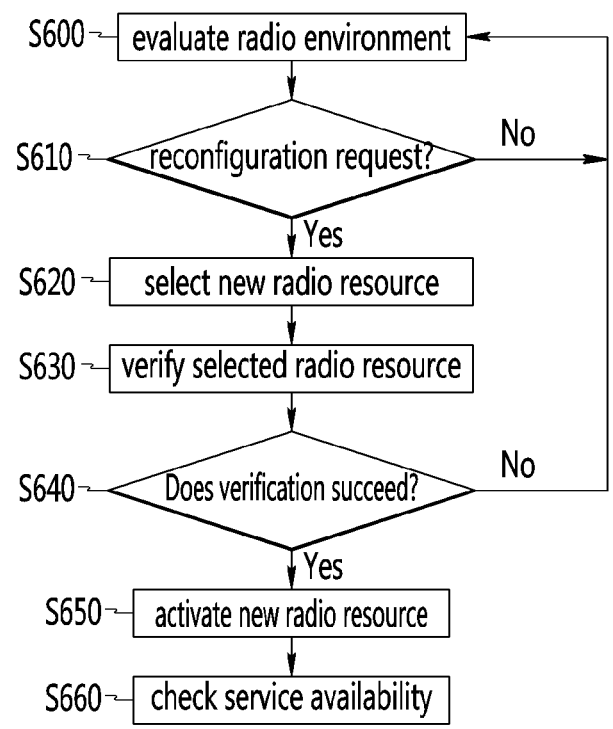
FIG. 6 is a flowchart showing a radio resource management method according to an exemplary embodiment of the present invention.

FIG. 5 is a block diagram showing a radio resource management apparatus according to an exemplary embodiment of the present invention, and FIG. 6 is a flowchart showing a radio resource management method according to an exemplary embodiment of the present invention.

Referring to FIG. 5, the radio resource management apparatus 500 includes a radio environment evaluation unit 510, a radio resource selection unit 520, a radio resource activation unit 530, a service checking unit 540, and a control unit 550. The radio resource management apparatus may include additional and/or different units. Similarly, the functionality of two or more of the above units may be integrated into a single component. For example, the radio resource management apparatus 500 may be a component of the base station 200.

Referring to FIGS. 5 and 6, the base station 200 provides a service to a terminal via an activated radio resource in an operational state. The radio resource evaluation unit 510 of the radio resource management apparatus 500 evaluates a radio environment around a base station in step S600. Examples of methods for radio environment evaluation include lowest evaluation, predictive evaluation, and measurement evaluation.

According to the lowest evaluation method, the radio environment evaluation unit 510 measures distance and signal strength using the OTAR function, and evaluates whether the distance and signal strength continuously meet reference values.

According to the predictive evaluation method, the radio resource evaluation unit 510 recognizes an adjacent radio environment based on the priority of information on the radio environment acquired in an information collection process illustrated in FIG. 4, and predicts a radio channel environment of the terminal. The predictive evaluation may be used in case the base station 200 cannot recognize the locations of the neighboring base stations 110, 120, and 130. The radio environment evaluation unit 510 evaluates whether a reference Signal to Interference plus Noise Ratio (SINR) (SINRTARGET) within a virtual service radius R is maintained. A method thereof may employ Equation 1.

$$SINR = P_{TX} - \left(RSSI + A + B\log_{10}\left(\frac{d_1 \times R}{d_1 - R}\right)\right) \quad \text{Equation 1}$$

In Equation 1, an exemplary channel path loss model is $A+B\log 10(d)$. $P_{TX}$ denotes the maximum transmission power of the base station 200, RSSI is the received signal strength of the base station, $d_1$ denotes the distance from the base station 200 to the neighboring base stations 110, 120, and 130, and R denotes a virtual service radius. Using equation 1, the radio environment evaluation unit 510 predicts the reference SINR SINRTARGET for the neighboring base stations 110, 120, and 130 within a virtual service radius R, and evaluates whether a predicted SINR meets the reference SINR SINRTARGET. According to predictive evaluation, evaluation can be done by applying the radio environment for all the neighboring base stations 110, 120, and 130.

According to the measurement evaluation, the radio environment evaluation unit 510 receives a report on a radio channel measurement value from a terminal, and stores the radio channel measurement value for each terminal.

The control unit 550 determines whether to reconfigure radio resources based on the radio environment evaluated by the radio environment evaluation unit 510 in step S610. The radio environment evaluation unit 510 performs at least one of lowest evaluation, predictive evaluation, and measurement evaluation, and the control unit 550 determines that it is necessary to reconfigure the radio resources if an evaluation result does not reach a reference value.

When the radio environment evaluation unit 510 performs lowest evaluation, if the distance and the measured strength do not meet reference values, the control unit 550 determines that a reconfiguration request is issued, and transitions from the operational state to the reconfiguration determination state.

When the radio environment evaluation unit 510 performs lowest evaluation, if a predicted SINR of all the neighboring base stations is greater than the reference SINR, the control unit 550 determines not to perform radio resource reconfiguration and remains in the operational state. If a predicted SINRS does not meet the reference value, the control unit 550 transitions from the operational state to the reconfiguration determination state.

When the radio environment evaluation unit 510 performs predictive evaluation, if the radio channel measurement value for each terminal does not meet the reference SINR, the control unit 550 determines that a reconfiguration request is issued, and transitions from the operational state to the reconfiguration determination state.

The radio resource management apparatus 500 transitions to the reconfiguration determination state, and in step S620 the radio resource selection unit 520 selects a new radio resource. The radio resource selection unit 520 selects a new radio resource from the radio resources other the radio resource already in use (existing radio resource). The radio resource selection unit 520 can select a new radio resource based on the priority of information on the radio environment acquired in an information collection process illustrated in FIG. 4. The radio environment evaluation unit 510 can select a new radio resource based on one of the values of lowest evaluation, predictive evaluation, and measurement evaluation.

The radio resource selection unit 520 verifies whether the selected radio resource can provide a good service quality in step S630, and determines whether the verification is successful in operation S640. For example, if the selected radio resource is maintained the same for a predetermined period of time, the radio resource selection unit 520 can determine that the selected radio resource is verified.

If the verification of the selected radio resource succeeds, a transition is made to the reconfiguration progress state. In the reconfiguration progress state, the radio resource activation unit 530 activates the new radio resource, and releases the existing radio resource in step S650. The service checking unit 540 checks whether the base station can provide a service to a terminal by using the new radio resource in step S660. A method in which the radio resource management apparatus 500 activates a new radio resource will be described below with reference to FIGS. 7 and 8.

Figure 7:
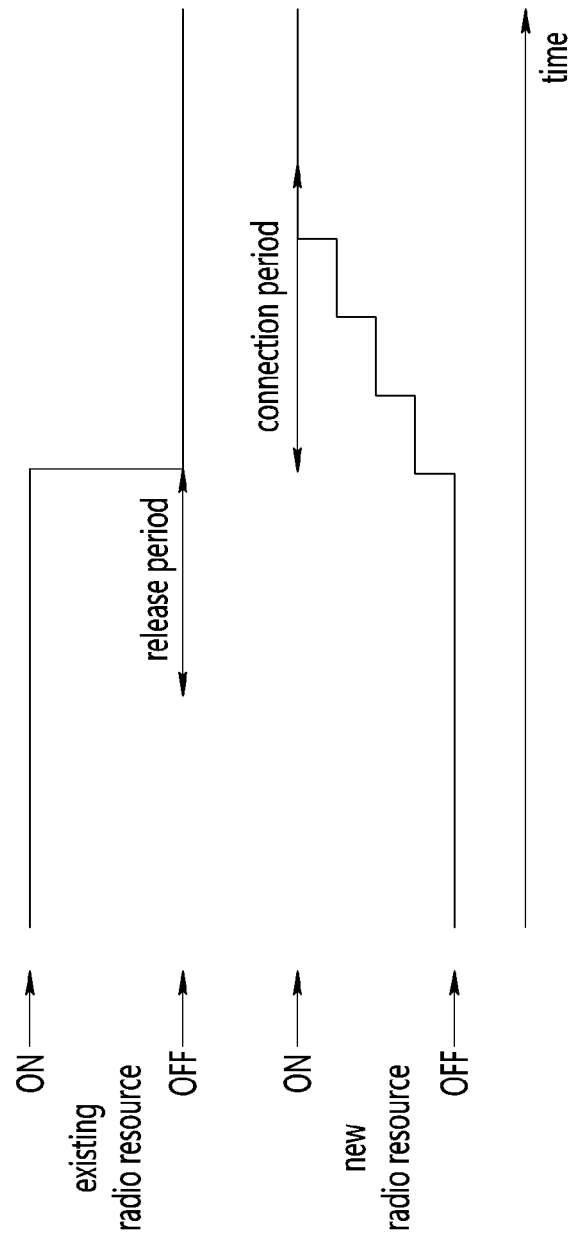
FIG. 7 is a view showing a radio resource activation method according to an exemplary embodiment of the present invention.
Figure 8:
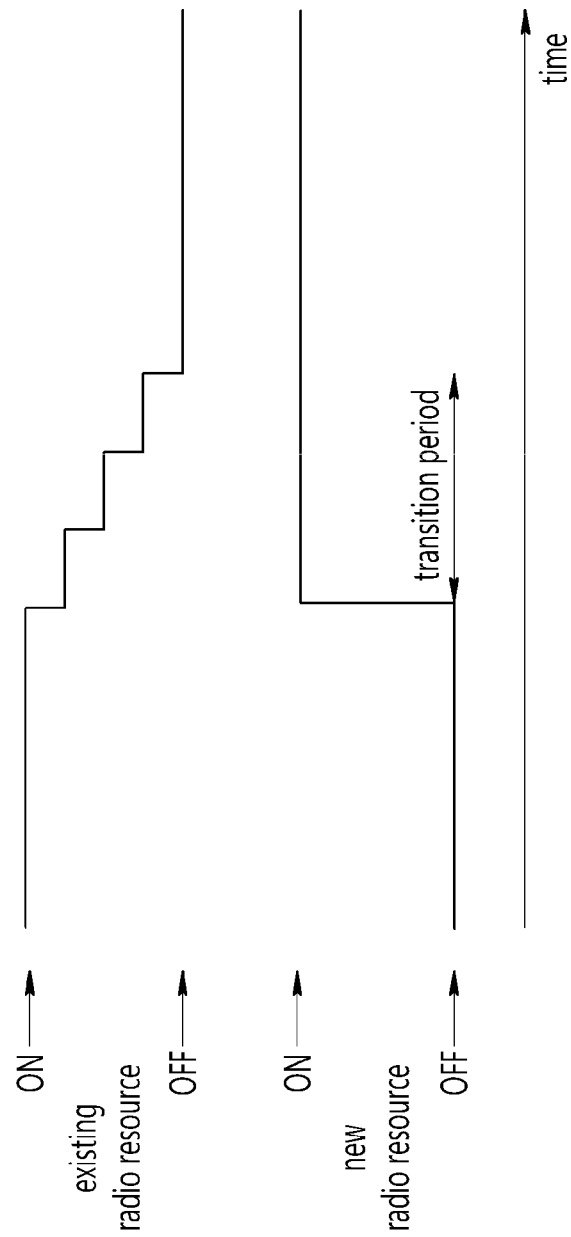
FIG. 8 is a view showing a radio resource activation method according to an exemplary embodiment of the present invention.

FIG. 7 is a view showing a radio resource activation method according to an exemplary embodiment of the present invention, and FIG. 8 is a view showing a radio resource activation method according to another exemplary embodiment of the present invention.

Referring to FIG. 7, the radio resource management apparatus 500 releases (ON→OFF) the existing radio resource during a release period, and then activates (OFF→ON) a new radio resource during a connection period. In order to release the existing radio resource, the radio resource management apparatus 500 transmits a deregistration-command (DREG-CMD) message to terminals connected by the existing radio resource. The DREG-CMD message is set with Action Code=00. Action Code=00 may indicate that the terminal should immediately terminate the connection to the serving base station and attempt a network access to another base station. The terminal having received the DREG-CMD message set with Action Code=00 can terminate the connection to the base station 200, and attempt a connection to a new base station.

The new base station selected by the terminal acquires information for providing a service to the terminal, and, if the acquired information meets a predetermined condition, permits a connection from the terminal and provides the service to the terminal. The predetermined condition may refer to a condition that a new base station should be connected to a backbone network and a condition that the existing base station should permit the provision of a service from the new base station to a terminal. To this end, the existing base station should be connected to the backbone network. If a terminal attempts a connection to a new base station, both of the existing base station and the new base station should be connected to the backbone network to exchange signals.

A new radio resource is activated after the existing radio resource is released. After the power of the new radio resource becomes sufficiently high, the terminal attempts a connection via handover to a new radio resource. If the terminal receives a signal from the new base station and connects to the new base station to perform a service, the terminal hands over to the new base station. If the terminal does not connect to the base station, the terminal selects a new radio resource and performs a network connection procedure.

At this point, the power for the new radio resource may gradually increase in many steps or in one step. If the power for the new radio resource gradually increases, a connection is made to the base station, starting from a terminal located around the base station, thus reducing the load of the base station. If the power for the radio resource increases in one step, a plurality of terminals can simultaneously recognize the new radio resource.

In a connection period, only a network connection or handover to a released terminal may be permitted, and a network connection or handover to a new terminal may not be permitted. Therefore, the load of the base station can be reduced.

Referring to FIG. 8, the radio resource management apparatus 500 activates (OFF→ON) the new radio resource, and then releases (ON→OFF) the existing radio resource. At this point, the power for the existing radio resource may gradually increase in many steps. Therefore, the terminals can gradually release their connection to the existing radio resource and perform a handover to the new radio resource, thereby continuously performing the service. A transition period in which the existing radio resource is released can be adaptively adjusted according to the cause of interference.

The base station does not permit a new connection to the existing radio resource after the new radio resource is activated. The base station determines the priority of terminals already connected to the existing radio resource based on the radio environment, and transmits a message requesting a handover to the new radio resource according to priority, for example, a MOB_BSHO_REQ message. The MOB_B-SHO_REQ message includes at least one of: 1) Mode field; 2) Hand Over (HO) operation mode field; 3) Unsolicited UpLink (UL) grant for HO-Indication (HO-IND) flag field; and 4) other handover-related fields. When Mode=0b000, this indicates a handover request. When HO operation mode=1, this indicates a forced handover request. When Unsolicited UL grant for HO-IND flag=1, this indicates that a base station should allocate UL Grant for handover indication after a handover indication preparation period of time. Therefore, the terminals performing the service using the existing radio resource can change the serving base station during a transition period.

A process in which the radio resource management apparatus 500 checks a service availability of terminals for a new radio resource will now be described. The terminals connected by the existing radio resource can be divided into terminals in an idle state (hereinafter, idle terminals) and terminals in an active state (hereinafter, active terminals). The active terminals perform handover to transfer to a new base station. Since the active terminals periodically transmit their channel state to the base station 200, the radio resource management apparatus 500 can easily check the service availability for the active terminals via the new radio resource.

However, since there is no procedure for enabling the idle terminals to transmit their channel state to the base station, the radio resource management apparatus 500 cannot check the service availability for the idle terminals via the new radio resource. The idle terminals perform position registrations to check the service availability. If the previous base station and the new base station are located at the same position registration region, the idle terminals do not need to perform position registrations. If the previous base station and the new base station are located at different position registration regions, the idle terminals have to perform position registrations. A process that the idle terminals perform a network connection for the position registrations and the radio resource management apparatus check the service availability for the idle terminals will be described below.

Figure 9:
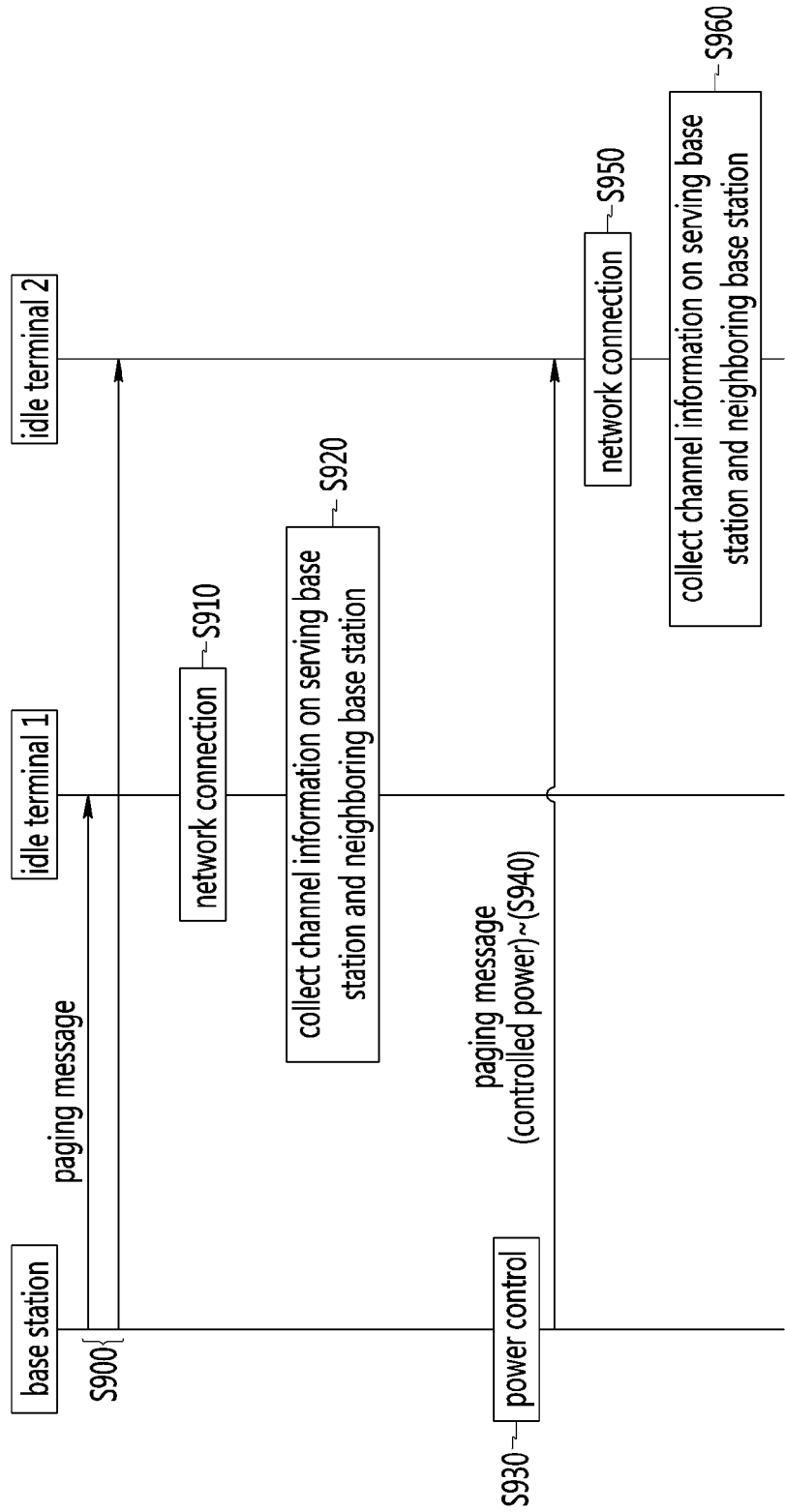
FIG. 9 is a flowchart showing a method in which a radio resource management apparatus that has activated a new radio resource checks a service availability for idle terminals according to an exemplary embodiment of the present invention.

FIG. 9 is a flowchart showing a method in which a radio resource management apparatus that has activated a new radio resource checks a service availability for idle terminals according to an exemplary embodiment of the present invention.

Referring to FIG. 9, the base station 200 transmits a paging message to the idle terminals requesting a network connection in step S900. The paging message may be, for example, a paging advertisement (MOB_PAG-ADV) message. The MOB_PAG-ADV message includes an Action Code=0b10 Enter network.

The terminals receiving the paging message perform a network connection procedure in step S910. The network connection procedure may be performed through, for example, initial connection RNG, basic function enhancement SBC, authentication PKM, registration REG, traffic connection setup DSA, etc.

The terminals having completed network registration collect channel information on the serving base station and neighboring base stations in step S920. The channel information may be, for example, a Carrier-to-Interference-and-Noise Ratio (CINR) or a Received Signal Strength Indicator (RSSI). Channel information on the serving base station may be collected through, for example, a report-request/response (REP-REQ/RSP) procedure, and channel information on the neighboring base stations may be collected through, for example, an scanning-request/response/report (SCN-REQ/RSP/REP) procedure.

If any terminals have failed in network registration after the transmission of the paging message, the base station controls its power in step S930, and transmits a paging message by the controlled power in step S940. Afterwards, the terminals having received the paging message perform a network connection procedure in step S950, and collect channel information on the serving base station and neighboring base stations in step S960.

Figure 10:
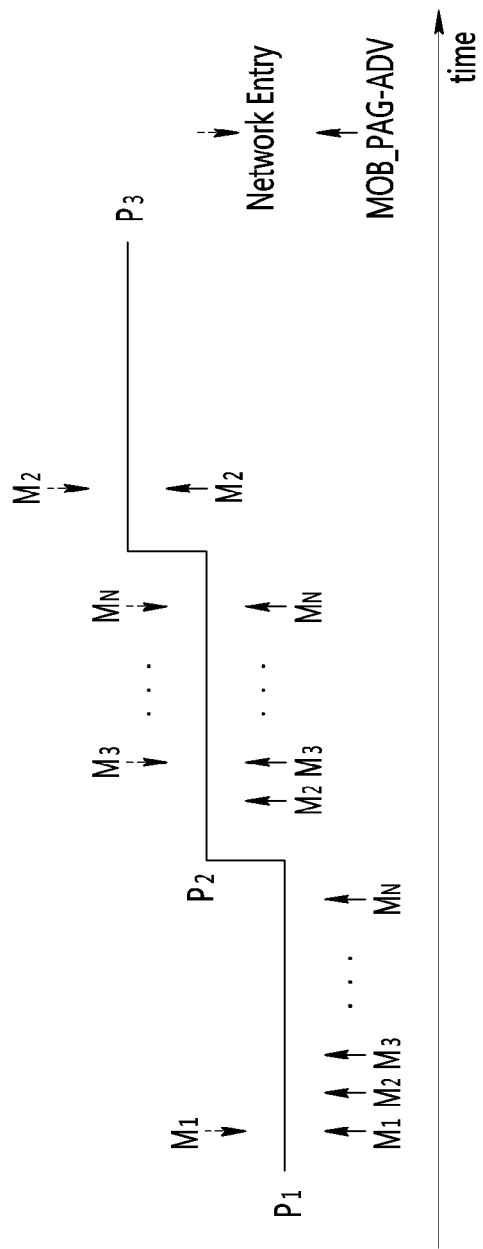
FIG. 10 is a view showing a power control method for a base station to check the service availability for idle terminals according to an exemplary embodiment of the present invention.

FIG. 10 is a view showing a power control method for a base station to check the service availability for idle terminals according to an exemplary embodiment of the present invention.

Referring to FIG. 10, when there are N terminals M1-MN, a MOB_PAG-ADV message is transmitted to N idle terminals by power P1. If only terminal M1 among the terminals M1-MN succeeds in network connection, the base station controls its power to P2 and transmits a MOB_PAG-ADV message to the remaining idle terminals by power P2. Hereupon, if the terminals M3-MN succeed in network connection and only the terminal M2 fails in network connection, the base station controls its power to P3 and transmits a MOB_PAG-ADV message to the terminal M2. Such power control can be performed in each cycle during which the base station performs paging on the idle terminals.

In this way, it is possible to efficiently operate a communication environment through a process of measuring a radio environment, selecting a new radio resource based on the radio environment, and activating the new radio resource.

Exemplary embodiments of the present invention can also be implemented through a program for realizing functions corresponding to the configuration of the exemplary embodiment of the present invention and a recording medium having the program recorded thereon. Such a recording medium is to be understood as a tangible recording medium, including, for example, Random Access Memory (RAM), Read-Only Memory (ROM), a hard disk, optical media such as a Blu-ray disc or CD, and flash memory.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for managing radio resources of a base station, the method comprising:

evaluating a radio environment between the base station and at least one neighboring base station or a radio environment between the base station and terminals connected to the base station;

when the evaluated radio environment does not meet predetermined criteria, selecting a new radio resource; and deactivating the existing radio resource and activating the new radio resource, wherein deactivating the existing radio resource and activating the new radio resource comprises releasing the existing radio resource and increasing a power of the new radio resource gradually in predetermined increments after the existing radio resource is released, or decreasing a power of the existing radio resource gradually in predetermined decrements to release the existing radio resource after the new radio resource is activated, wherein each of the existing radio resource and the new radio resource include a preamble index, and wherein, when a plurality of terminals is in an idle state, increasing the power of the new radio resource gradually includes:

transmitting a paging message to the plurality of terminals at a power of a first level, increasing the power from the first level to a second level when only at least one first terminal succeeds in network connection from among the plurality of terminals, and transmitting the paging message to remaining terminals at the power of the second level, and increasing the power from the second level to a third level when at least one second terminal fails in network connection from among the remaining terminals, and transmitting the paging message to the second terminal at the power of the third level.

2. The method of claim 1, wherein the evaluating comprises:

measuring a distance between the base station and the neighboring base station and a signal strength received from the neighboring base station; and evaluating the radio environment by comparing the distance or the signal strength with a reference value.

3. The method of claim 1, wherein the evaluating comprises:
   predicting a channel state of the neighboring base station within a predetermined distance from the base station; and
   evaluating the radio environment by comparing the predicted channel state with a reference channel state.

4. The method of claim 1, wherein the evaluating comprises:
   receiving information on channel measurement values from the terminals; and
   evaluating the radio environment by comparing the channel measurement values with a reference channel measurement value.

5. The method of claim 1, wherein the selecting comprises:
   selecting a new radio resource from the radio resources other than the existing radio resource; and
   verifying whether the new radio resource provides service quality of a predetermined level.

6. The method of claim 1, further comprising, after activating the new radio resource, checking whether service is available via the new radio resource.

7. The method of claim 6, wherein the checking comprises:
   receiving information on the channel state from terminals in an active state; and
   upon receiving the information on the channel state, determining that service is available via the new radio resource.

8. An apparatus for managing radio resources of a base station, the apparatus comprising:
   a radio environment evaluation unit for evaluating a radio environment between the base station and at least one neighboring base station or a radio environment between the base station and terminals connected to the base station;
   a radio resource selection unit for, when the evaluated radio environment does not meet predetermined criteria, selecting a new radio resource; and
   a radio resource activation unit for deactivating the existing radio resource and activating the new radio resource,
   wherein the radio resource activation unit deactivates the existing radio resource and activates the new radio resource by releasing the existing radio resource and increasing a power of the new radio resource gradually in predetermined increments after the existing radio resource is released, or by decreasing a power of the existing radio resource gradually in predetermined decrements to release the existing radio resource after the new radio resource is activated,
   wherein each of the existing radio resource and the new radio resource include a preamble index, and
   wherein, when a plurality of terminals is in an idle state, increasing the power of the new radio resource gradually in the radio resource activation unit includes:
      transmitting a paging message to the plurality of terminals at a power of a first level,
      increasing the power from the first level to a second level when only at least one first terminal succeeds in network connection from among the plurality of terminal, and transmitting the paging message to remaining terminals at the power of the second level, and
      increasing the power from the second level to a third level when at least one second terminal fails in network connection from among the remaining terminals, and transmitting the paging message to the second terminal at the power of the third level.

9. The apparatus of claim 8, wherein the radio environment evaluation unit evaluates the radio environment by using at least one of:
   a first method of measuring a distance between the base station and the neighboring base station or a signal strength received from the neighboring base station and comparing the distance or the signal strength with a reference value;
   a second method of predicting a channel state of the neighboring base station within a predetermined distance from the base station and comparing the predicted channel state with a reference channel state; and
   a third method of receiving information on channel measurement values from the terminals and comparing the channel measurement values with a reference channel measurement value.

10. The apparatus of claim 8, wherein the radio resource selection unit verifies whether the new radio resource provides service quality of a predetermined level.

11. The apparatus of claim 8, further comprising a service checking unit for determining whether service is available for the terminals via the new radio resource based on the information on the channel state received from the terminals after the activation of the new radio resource.

12. The apparatus of claim 11, wherein the service checking unit determines whether any of the terminals are idle, transmits a paging message to each of the idle terminals, and determines that the service is available when channel state information is received from the idle terminals.

13. A method of managing radio resources in a mobile base station, the method comprising:
   operating in an operational state while a radio environment quality of an existing radio resource is within a reference value;
   operating in a reconfiguration determination state in which the mobile base station searches for and selects a new radio resource other than the existing radio resource; and
   operating in a reconfiguration progress state in which the mobile base station activates the new radio resource, deactivates the existing radio resource, and permits terminals to access the mobile base station via the new radio resource,
   wherein the mobile base station transitions from the operational state to the reconfiguration state when the radio environment quality is determined to be lower than the reference value, transitions from the reconfiguration determination state to the operational state when the mobile base station determines that the new radio resource does not need to be selected, transitions from the reconfiguration determination state to the reconfiguration progress state when the new radio resource is selected and verified, and transitions to the operational state from the reconfiguration progress state when the activation and deactivation processes are completed, and
   wherein the mobile base station activates the new radio resource and deactivates the existing radio resource by releasing the existing radio resource and increasing a power of the new radio resource gradually in predetermined increments after the existing radio resource is released, or by decreasing a power of the existing radio resource gradually in predetermined decrements to release the existing radio resource after the new radio resource is activated,
   wherein each of the existing radio resource and the new radio resource includes a preamble index, and wherein, when a plurality of terminals is in an idle state, increasing the power of the new radio resource gradually includes:
transmitting a paging message to the plurality of terminals at a power of a first level,
increasing the power from the first level to a second level when only at least one first terminal succeeds in network connection from among the plurality of terminals, and transmitting the paging message to remaining terminals at the power of the second level, and
increasing the power from the second level to a third level when at least one second terminal fails in network connection from among the remaining terminals, and transmitting the paging message to the second terminal at the power of the third level.

* * * * *